US006680464B1

(12) United States Patent
Carter, Jr. et al.

(10) Patent No.: US 6,680,464 B1
(45) Date of Patent: Jan. 20, 2004

(54) ELECTROFUSION JOINING CONTROL DEVICE

(75) Inventors: Robert V. Carter, Jr., Erie, PA (US); Ronald P. Krahe, Girard, PA (US)

(73) Assignee: Zurn Industries, Inc., Erie, PA (US)

( * ) Notice: Subject to any disclaimer, the term of this patent is extended or adjusted under 35 U.S.C. 154(b) by 157 days.

(21) Appl. No.: 09/918,309

(22) Filed: Jul. 30, 2001

Related U.S. Application Data

(60) Provisional application No. 60/221,833, filed on Jul. 28, 2000.

(51) Int. Cl.[7] .............................. H05B 3/48; H05B 3/58; F16L 13/02; F16L 47/03
(52) U.S. Cl. ..................... 219/544; 219/201; 219/485; 219/535; 156/274.2
(58) Field of Search ................................. 219/544, 534, 219/535, 483, 485, 494, 200, 201; 156/272.2, 274.2

(56) References Cited

U.S. PATENT DOCUMENTS

| 3,546,204 A | | 12/1970 | Weaver et al. |
| 3,564,204 A | * | 2/1971 | Mense ........................ 219/497 |
| 4,486,650 A | * | 12/1984 | Bridgstock et al. ......... 219/544 |
| 4,523,084 A | | 6/1985 | Tamura et al. |
| 4,602,148 A | | 7/1986 | Ramsey |
| 4,631,107 A | | 12/1986 | Ramsey |
| 4,642,154 A | | 2/1987 | Thalmann et al. |
| 4,642,155 A | | 2/1987 | Ramsey |
| 4,684,789 A | | 8/1987 | Eggleston |
| 4,852,914 A | * | 8/1989 | Lyall ........................... 219/535 |
| 4,918,292 A | | 4/1990 | Nussbaum et al. |
| 4,978,837 A | | 12/1990 | Eggleston |
| 5,086,213 A | * | 2/1992 | Nussbaum et al. ......... 219/535 |
| 5,170,042 A | * | 12/1992 | Bunn ........................... 219/535 |
| 5,182,440 A | * | 1/1993 | Dugour et al. .............. 219/535 |
| 5,364,130 A | * | 11/1994 | Thalmann ................. 156/274.2 |
| 5,366,253 A | * | 11/1994 | Nakashiba et al. ......... 219/535 |
| 5,500,510 A | | 3/1996 | Kumagai |
| 5,620,625 A | | 4/1997 | Sauron et al. |
| 6,036,795 A | * | 3/2000 | Sauron et al. .............. 219/494 |

* cited by examiner

*Primary Examiner*—Joseph Pelham
(74) *Attorney, Agent, or Firm*—Webb, Ziesenheim Logsdon Orkin & Hanson, P.C.

(57) ABSTRACT

A piping system that includes a plurality of pipe made of thermoplastic material, a coupling and an arrangement for securing the pipe to the coupling. The coupling is configured so that either a fusable seal or mechanical seal can be used with the coupling to connect the pipe to the coupling with an electrofusion joining control device. Preferably, the pipe and coupling are made of thermoplastic material.

14 Claims, 8 Drawing Sheets

ELECTROFUSION JOINING CONTROL DEVICE

This application claims the benefit of U.S. Provisional Application Serial No. 60/221,833, filed Jul. 28, 2000, which is incorporated by reference in its entirety.

BACKGROUND OF THE INVENTION

1. Field of the Invention

The present invention relates to coupling of plastic pipes and machines for welding plastic pipe and, more particularly to coupling of plastic pipes by fusion welding or through a mechanical seal and a device to perform fusion welding.

2. Description of the Prior Art

Prior to the advent of plastic pipe, most piping was made out of metal, such as copper, stainless steel or iron. The particular metal used for the piping was dependent upon the application. For example, water could be transported through copper and/or cast-iron pipes. However, acids had to be transported in stainless steel pipe. Some of the metal pipe, such as copper and stainless steel, was expensive to manufacture and install. Typically, the pipe was either brazed or welded together. In some instances, mechanical type joints were provided for pipe connections. In today's market, all of these arrangements are expensive to manufacture and install.

Plastic pipe overcomes many of the expenses associated with metal pipe. Plastic pipe is inexpensive to manufacture and relatively easy and inexpensive to connect together. In the case of thermoplastic materials, such as polypropylene, the pipe can be welded together by providing a polypropylene sleeve with electrical heating elements embedded therein. This process is known as fusion welding. Fusion welded pipe is particularly applicable in situations where acid passes through the plastic pipe. Polypropylene pipe can be secured to each other through mechanical seals. In some applications, mechanical seals are preferable to the fusion welding.

In the past, different pipe couplings were provided for fusion sealing and mechanical sealing. This resulted in an increase in inventory required by the installer, such as the mechanical contractor or plumber, since two separate types of couplings were required, one for mechanical sealing and the other for fusion welding. Further, in the past machines have been used to weld plastic pipes.

Therefore, it is an object of the present invention to provide a single coupling for use with mechanical sealing and fusion welding of plastic pipe and a machine to weld many plastic pipes simultaneously and provide good weld joints.

SUMMARY OF THE INVENTION

The present invention is a piping system that includes a first pipe, a second pipe, a coupling, an arrangement for securing the first pipe to the coupling and an arrangement for securing the second pipe to the coupling. The first pipe is made of thermoplastic material having a first pipe first end. The second pipe is made of thermoplastic material having a second pipe first end. The coupling includes a body having a coupling first end and a coupling second end. The body has an outer surface and an inner surface. The inner surface defines a passageway and a lip positioned between the coupling first end and the coupling second end. The first pipe first end is received by the coupling first end and the second pipe first end is received by the coupling second end. The first pipe first end and the second pipe first end are positioned on opposite sides of the lip.

The pipe coupling can include pipe coupling threads defined on the outer surface of the coupling configured to engage with a nut, a first tapered inner surface adjacent the coupling first end and a second inner tapered surface adjacent the coupling second end and a plurality of circumferential rings defined on the inner surface. Axial ribs can be defined on the coupling outer surface and positioned between the threads positioned adjacent the coupling first end and the coupling second end.

The arrangement for securing the first pipe to the coupling and the arrangement for securing the second pipe to the coupling can be accomplished through a fusion seal or a mechanical seal. The fusion seal includes a sleeve made of thermoplastic material having an electrically resistive wire embedded therein and two leads attached to the electrically resistive wire extending from the sleeve. The sleeve is configured to be sandwiched between the pipe coupling and a thermoplastic pipe with the two leads extending from the piping coupling. The mechanical seal includes a flexible body received between the pipe coupling and the first pipe and a nut, the flexible body is held in place by the nut co-acting with the pipe coupling and an end of the flexible body. The nut includes inner threads that co-act with the pipe coupling threads. The nut includes an annular lip that defines a passageway configured to permit a thermoplastic pipe to pass there through, the annular lip contacts an end of the flexible body of the mechanical seal and holds the flexible body of the mechanical seal in place. The flexible body also includes a tapered portion adapted to co-act with the first tapered inner surface of the pipe coupling.

The present invention can be provided as a kit for joining thermoplastic pipe together.

Further, the present invention is a method for joining two thermoplastic pieces of pipe, that includes the steps of:

a) providing two pieces of thermoplastic pipe;

b) attaching either a fusible seal or a mechanical seal at the ends of each the pieces of thermoplastic pipe;

c) passing the ends of the pieces of thermoplastic pipe with the seals through ends of a thermoplastic pipe coupling and sandwiching the seals between the pipe coupling and the pieces of thermoplastic pipe; and d) forming a fluid tight seal between the pieces of thermoplastic pipe and the pipe coupling by either compressing the mechanical seal with a nut co-acting with the pipe coupling or heating the sleeve until the sleeve and adjacent portions of the pipe coupling and the pipe melt.

Further, the present invention includes an electrofusion joining device for facilitating the joining of two thermoplastic pieces of pipe by electrofusion. The device includes the following: an arrangement for determining the number and size of fusion seals to be joined; an arrangement for determining the wattage necessary to join the fusion seals to the polymeric pipes and couplings; an arrangement for determining process interruptions; an arrangement for compensating for process interruptions; an arrangement for determining ambient temperature; an arrangement for compensating for ambient temperature; and an arrangement for passing electric current and stopping electric current to the fusion seals.

Further, the present invention is a method for joining a polymeric fusion seal to a polymeric pipe and coupling using the electrofusion joining device. The method includes the following steps: a) connecting a plurality of fusion seals in electrical series to an electrofusion joining device to form an electrical circuit; b) determining the electrical resistance of the electrical circuit; c) calculating the wattage necessary to pass through the electrical circuit to melt the fusion seal and adjacent material of the polymeric pipe and polymeric coupling in a fixed period of time; d) passing current through the electrical circuit for the fixed or set period of time based on ambient temperature and possible circuit interruptions and causing the fusion seal to be melted to be joined to the adjacent pipe and the adjacent coupling; and e) stopping the current and permitting the joined seal to cool.

DESCRIPTION OF THE PREFERRED EMBODIMENTS

Figure 1:
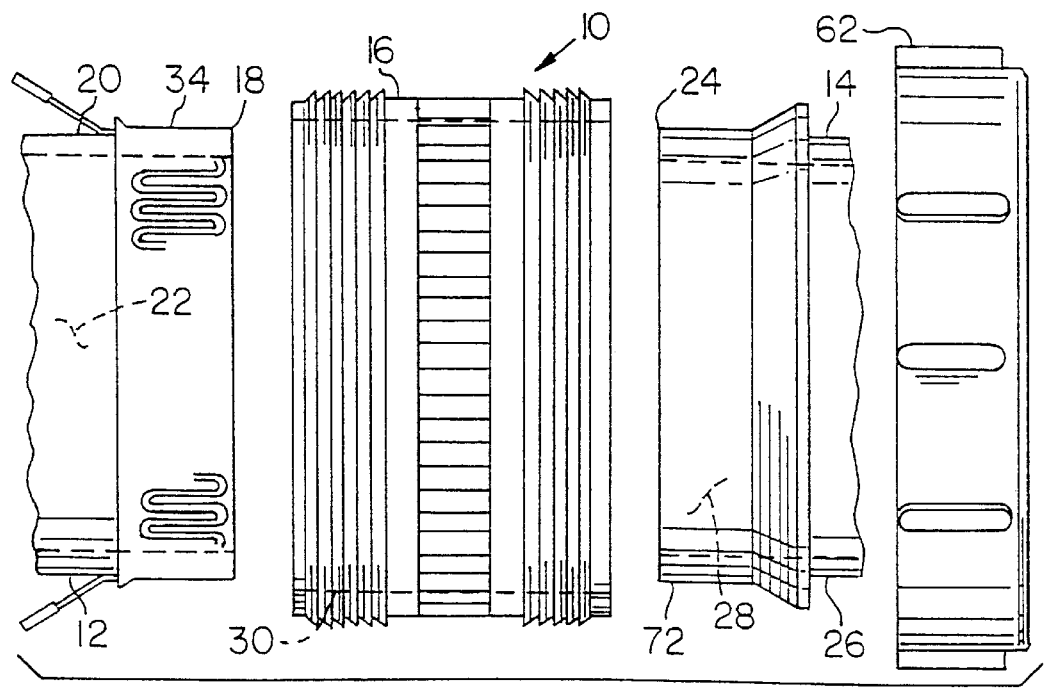
FIG. 1 is an exploded elevational view of a pipe coupling system that includes pipe, a fusion seal, a mechanical seal, a coupling and a nut made in accordance with the present invention.
Figure 2:
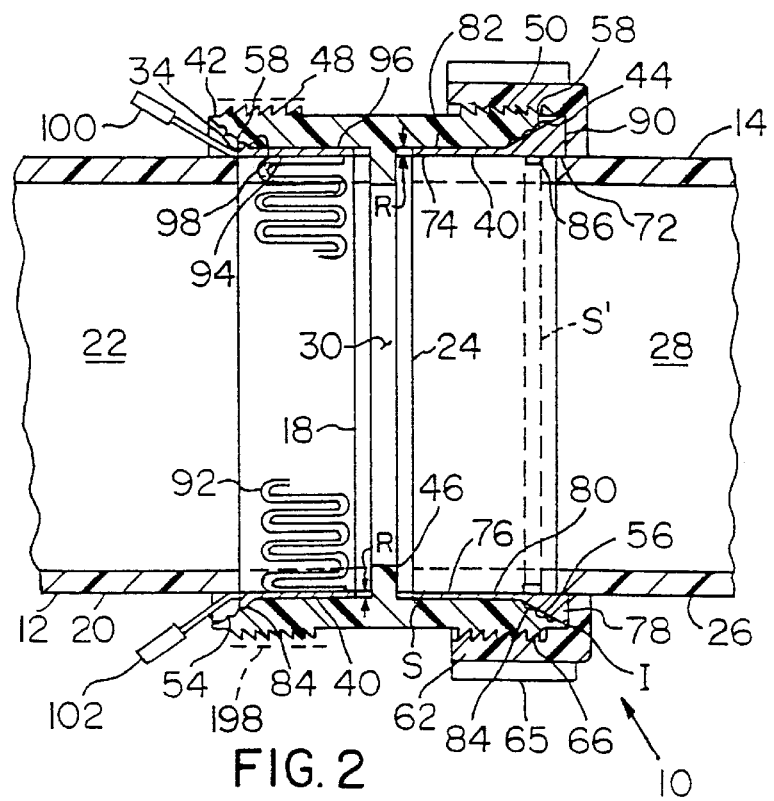
FIG. 2 is an elevational view, partially in section, of the piping coupling system shown in FIG. 1.

FIG. 1 shows a pipe coupling system 10 made in accordance with the present invention. The pipe coupling system 10 includes a first thermoplastic pipe 12 and a second thermoplastic pipe 14 secured to each other by a pipe coupling or pipe fitting 16. Preferably, the first thermoplastic pipe 12 and the second thermoplastic 14 are made of a polypropylene, such as a polypropylene from Montell North America, Three Little Falls Centre, 2801 Centerville Road, Wilmington, Del. 19808. The first thermoplastic pipe 12 includes a first thermoplastic pipe first end 18 and a first thermoplastic pipe outer surface 20. A first thermoplastic pipe passageway 22 is defined by an inner surface of the first thermoplastic pipe. The second thermoplastic pipe 14 includes a second thermoplastic pipe 14 first end 24 and a second thermoplastic pipe outer surface 26. An inner surface of the second thermoplastic pipe 14 defines a second thermoplastic pipe passageway 28. The pipe coupling 16 includes an inner surface that defines a pipe coupling passageway 30. As shown in FIG. 2, the first thermoplastic pipe passageway 22, the second thermoplastic pipe passageway 28 and the pipe coupling passageway 30 are in fluid communication with each other. Generally speaking, the first thermoplastic pipe 12, the second thermoplastic pipe 14 and the pipe coupling 16 are substantially cylindrically in shape. However, the passageways defined therein may take other forms, such as square.

Figure 3:
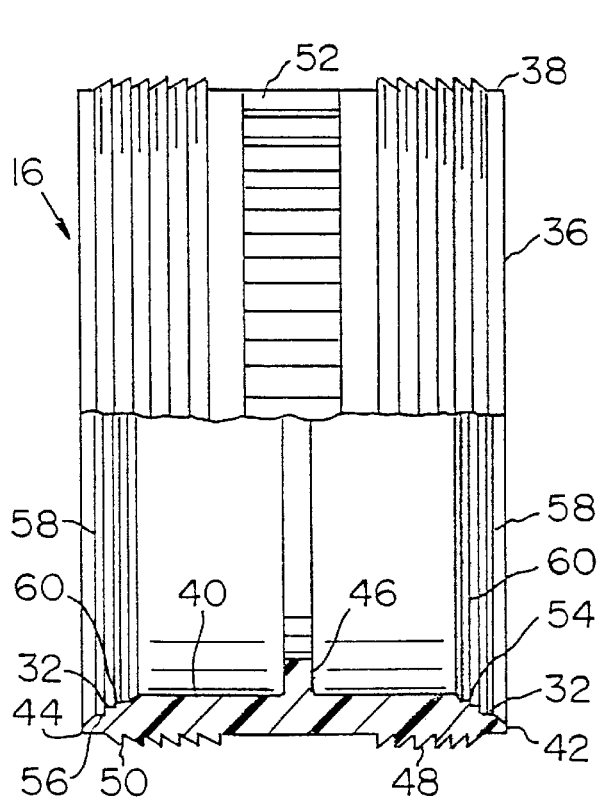
FIG. 3 is an elevational view, partially in section, of the coupling shown in FIG. 1.

Referring to FIGS. 2 and 3, the pipe coupling 16 includes a mechanical sealing surface 32 and is adapted or configured to receive a fusion seal 34. Preferably, the pipe coupling 16 is made of thermoplastic material, which is the same thermoplastic material used for the first thermoplastic pipe 12 and the second thermoplastic pipe 14. Referring specifically to FIG. 3, the pipe coupling 16 includes a pipe coupling body 36 having a pipe coupling outer surface 38 and a pipe coupling inner surface 40. The pipe coupling 16 includes a pipe coupling first end 42 and an oppositely positioned pipe coupling second end 44. An annular lip 46 is defined by the pipe coupling inner surface 40 midway between the pipe coupling first end 42 and the pipe coupling second end 44, which are positioned on opposite sides of the annular lip 46. A first set of threads 48 is defined adjacent the pipe coupling first end 42 and a second set of threads 50 is defined adjacent the pipe coupling second end 44. The threads 48 and 50 are defined as the pipe coupling outer surface 38. Axially extending exterior ribs 52 are circumferentially spaced about the pipe coupling outer surface 38. Alternatively, a plurality of flat surfaces can be provided in lieu of the exterior ribs 52, to form a geometric shape, such as a hexagon or octagon. The exterior ribs 52 are positioned between the first set of threads 48 and the second set of threads 50. A first inner tapered surface 54 and a second inner tapered surface 56 are defined by the pipe coupling inner surface 40 and are adjacent the pipe coupling first end 42 and the pipe coupling second end 44. A plurality of inwardly positioned axially spaced circumferential rings 58 (such as two, three or four rings) are positioned on the first inner tapered surface 54 and the second inner tapered surface 56. Recesses 60 are defined between the circumferential rings 58.

Figure 4:
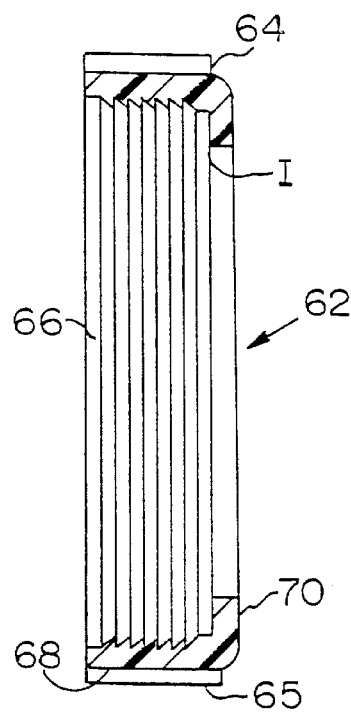
FIG. 4 is a sectional elevational view of the nut shown in FIG. 1.

FIGS. 2 and 4 show a nut 62 that is used in the pipe coupling system 10 when a mechanical seal is used and configured to co-act with the first set of threads 48 and the second set of threads 50 of the pipe coupling 16. The nut 62 is preferably made of a polypropylene and includes a body 64. Preferably, the nut 62 is made of the same thermoplastic material as the coupling 16. Axially extending ribs 65 are positioned about an outer surface of the body 64. Inner threads 66 are defined about an inner surface of the body 64. The body includes cylindrical first portion 68 that includes the inner threads 66, and an annular lip second portion 70 that is integrally connected to the cylindrical first portion 68. A passageway is defined by the annular lip 70 and the cylindrical first portion 68 through which a thermoplastic pipe, such as the first thermoplastic pipe 12 and the second thermoplastic pipe 14, can extend.

Figure 7:
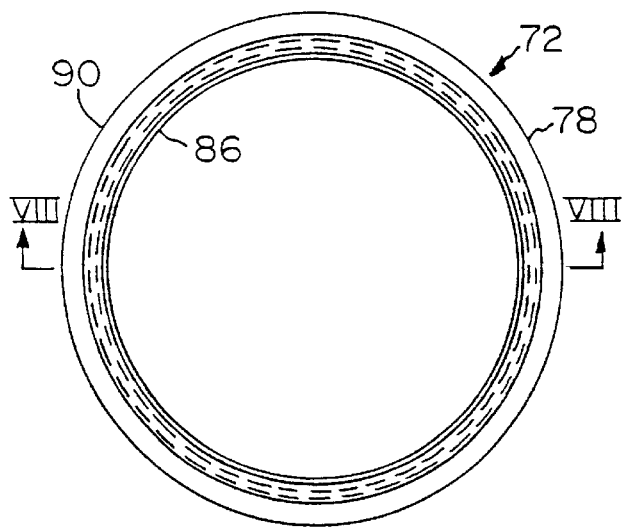
FIG. 7 is a plan view of the mechanical seal shown in FIG. 1.
Figure 8:
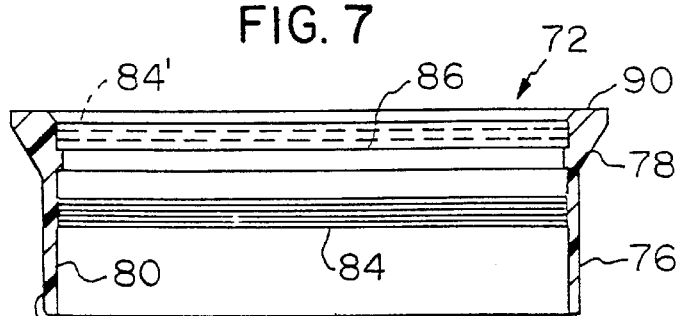
FIG. 8 is a section taken along line VIII—VIII of FIG. 7.

FIGS. 2, 7 and 8 show a mechanical seal 72 made in accordance with the present invention. Preferably, the mechanical seal 72 is flexible and made of a low density polyethylene (LDPE), which is manufactured by Mobil Polymers, 2195 Lincoln Highway, Edison, N.J. The mechanical seal 72 is adapted to be received between a gap 74 defined between a pipe, in this case the second thermoplastic pipe 14, and the pipe coupling 16, as shown in FIG.

2. The mechanical seal 72 includes a flexible body having a cylindrical portion 76 integrally attached to a tapered portion 78. The mechanical seal 72 includes a substantially cylindrical inner surface 80 and an outer surface 82. A plurality of inner circumferential rings 84 are defined on the inner surface 80 of the cylindrical portion 76 and a ring 86 is defined on the inner surface 80 of the tapered portion 78. Alternatively, the inner circumferential rings 84 may be eliminated or a circumferential ring 84', shown in phantom, can be provided. The circumferential rings 84 and ring 86 are adapted to sealingly co-act with an outer pipe surface "s", which in this case is the second thermoplastic pipe outer surface 26. The ring 86 is adapted to be received in a recess defined in the outer pipe surface for alignment of the mechanical seal 72 on the respective pipe. An abutting end 90 is defined on the tapered portion of the mechanical seal 72.

Figure 9:
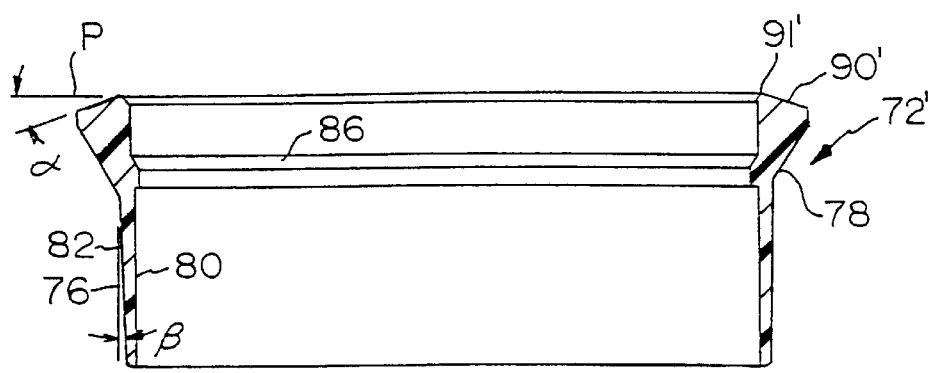
FIG. 9 is a section of a second embodiment of a mechanical seal similar to the section shown in FIG. 8.

FIG. 9 shows a second embodiment of a mechanical seal 72', which is similar to the mechanical seal 72, except for the below noted differences. The mechanical seal 72' includes an angled abutting end 90'. An angle α of the angled abutting end 90' is defined from a plane P and is preferably between 5°–10°. An uppermost portion 91' is adapted to be positioned adjacent the outer pipe surface "s". The outer surface 82 of the cylindrical portion 76 can have a slight taper such as 1° as represented by the angle β. The previously described circumferential rings 84 and 84' may be provided.

Figure 5:
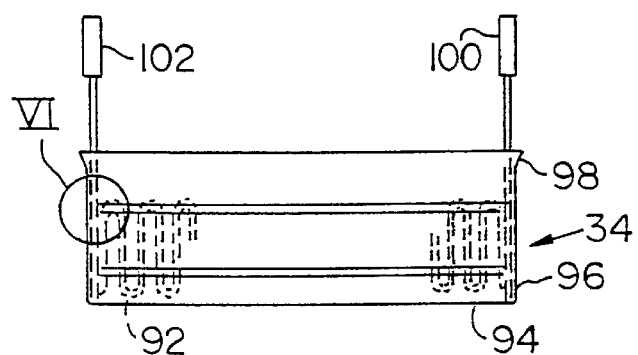
FIG. 5 is an elevational view of the fusion seal shown in FIG. 1.
Figure 6:
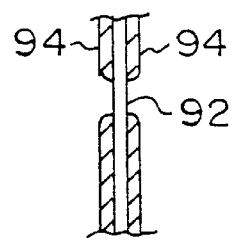
FIG. 6 is a partial sectional view of a portion of the fusion seal shown in FIG. 5.

FIGS. 2, 5 and 6 show the fusion seal 34 made in accordance with the present invention. The fusion seal 34 includes a circumferential-looped electrical resistive wire 92 embedded within a cylindrical thermoplastic sleeve 94. Preferably, the electrical resistive wire or heating element 92 is made out of nickel-chrome or a normal heating wire with nickel plate. Preferably, the electrical resistive wire 92 is made of eighteen (18) gage wire and has a resistance measured in ohms per inch. The resistance of the wire varies depending on the application. Further, preferably the thermoplastic sleeve is made of a polypropylene, such as that previously described and used for the thermoplastic pipe 12 and 14. The thermoplastic sleeve 94 includes a cylindrical portion 96 and an integral tapered portion 98. Exposed electrical resistive wire lead 100 and 102 are attached to the resistive wire 92.

The method of connecting, the first thermoplastic pipe 12 to the second thermoplastic pipe 14 using the coupling 16 is set forth as follows. Initially, the installer must decide whether the thermoplastic pipes 12 and 14 are to be mechanically sealed or sealed through fusion welding. In some instances, one of the thermoplastic pipe 12 or 14, is to mechanically sealed to the pipe coupling 16 and the other of the thermoplastic pipe 12 or 14 is to be fusion welded to the pipe coupling 16. For the purpose of example, the latter situation, which is shown in FIGS. 1 and 2, is described as follows.

The fusion seal 34 is slid over the first thermoplastic pipe first end 18, as shown in FIG. 2. The tapered portion 98 of the fusion seal 34 is positioned away from the first thermoplastic first end 18 and the cylindrical portion 96 of the fusion seal 34 is positioned adjacent the first thermoplastic pipe first end 18. The first thermoplastic pipe first end 18 with the fusion seal 34 is then positioned through and received by the pipe coupling first end 18 and within the pipe coupling 36 until the first thermoplastic pipe first portion 18 abuts against the annular lip 46. In this arrangement, the cylindrical portion 96 abuts against the pipe coupling inner surface 40 and the tapered portion 98 of the fusion seal 34 abuts against a portion of the first inner tapered surface 54. Preferably, the tapered portion 98 abuts against one of the circumferential rings 84, as shown in FIG. 2. The electrical resistive wire leads 100 and 102 extend away from the pipe coupling 16 and the pipe 12. Preferably, the thickness of the gap 74, as designated by R, is less than or equal to the thickness of the thermoplastic sleeve 94. Therefore, the thermoplastic sleeve 94 is sandwiched and compressed between the pipe coupling 16 and the pipe 12. Preferably, a clamp 198 (shown in phantom in FIG. 2), such as model number 942AD-0550 H98, manufactured by Clampco of Wadsworth, Ohio, is placed around the pipe coupling outer surface and over the sleeve 94. The clamp is tightened to apply radial pressure and force to the pipe 12, pipe coupling 16 and the sleeve 94.

Electric current, having a voltage of typically 120 volt AC (alternating current), is passed through the resistive wire 92 via the leads 100 and 102. The electric current causes the resistive wire 92 to heat, thereby causing the thermoplastic sleeve 94 and adjacent portions of thermoplastic pipe 12 and the pipe coupling 16 to melt. After a period of time, the electric current is stopped from passing through the resistive wire 92. The thermoplastic of the pipe 12, the pipe coupling 16 and the sleeve 94 are permitted to cool and harden, thereby forming a fluid tight seal between the first thermoplastic pipe 12 and the coupling 16. The clamp 200 is removed. The exposed leads 100 and 102 and the exposed resistive wire 92 may then be cut and removed from the thermoplastic sleeve 94. Alternatively, the exposed leads 100 and 102 can be left alone for future heating and melting of the thermoplastic sleeve 94, should a leak develop or the pipe need to be replaced.

Referring again to FIG. 2, the mechanical seal 72 is slidably received by the second thermoplastic pipe 14 so that the tapered portion 78 is positioned away from the second thermoplastic pipe first end 24 and the cylindrical portion 76 of the mechanical seal 72 is positioned adjacent the second thermoplastic pipe first end 24. Preferably, an annular slot "s'" is defined on the second thermoplastic pipe outer surface 26 near the second thermoplastic pipe first end 24 so that the ring 86 is received therein for aligning the mechanical seal 72 with the thermoplastic pipe first end 24 and the coupling 16. The inner circumferential rings 84 abut against the second thermoplastic pipe outer surface 26. The second thermoplastic pipe 14 is then inserted into and received by the pipe coupling second end 44 until the second thermoplastic pipe first end 24 nearly abuts against the annular lip 46. In this arrangement, the cylindrical portion 76 of the mechanical seal 72 is positioned between the second thermoplastic pipe outer surface 26 and the pipe coupling inner surface 40. The tapered portion 78 of the mechanical seal 72 abuts against the second inner tapered surface 56. The circumferential rings 58 positioned on the second inner tapered surface 56 of the pipe coupling 36 contact the tapered portion 78 of the mechanical seal 72. The abutting end 90 of the mechanical seal 72 extends beyond the pipe coupling second end 44. The nut 62, which is initially slid onto the second thermoplastic pipe 14 through the annular lip 70 and cylindrical first portion 68, is then threadably engaged with the second set of threads 50 until an inner surface I of the annular lip 70 contacts the abutting end 90. The nut 62 is further tightened, preferably with wrenches or other tightening mechanism, which engage with axial ribs 65 of the nut 62 and the axially extending exterior ribs 52 of the pipe coupling 16, urging the mechanical seal 72 toward the annular lip 46 of the pipe coupling 16. This action causes the mechanical seal 72 to expand in the radial direction and compress along axial direction, thereby forming a fluid seal between the second thermoplastic pipe 14 and the pipe coupling 16. In other words, the flexible body of the mechanical seal 72 is held in place by the nut 62 co-acting with the pipe coupling 16 and the abutting end 90. The seal 72' can be used in lieu of seal 72. It has been found that the angled abutting end 90' improves engagement of the seal 72' by concentrating the force applied by the nut 62 to the uppermost portion 91'. It is believed that the angled abutting end 90' eliminates the need of heating the mechanical seal to slip over the thermoplastic pipe which may be necessary in prior art mechanical seal arrangements.

In many instances, pipe will be connected to both ends of the pipe coupling 16 in the same manner, i.e., either through mechanical seals 72 or fusion seals 34. It should be understood that the pipe coupling system shown in FIG. 2 could include two mechanical seals 72 or two fusion seals 34 as opposed to one mechanical seal 72 and one fusion seal 34. As should be evident, the nut 62 is only used with the mechanical seal.

The present invention overcomes the disadvantage of the prior art, which requires separate inventory for fusion seal type couplings and mechanical seal type couplings. The present invention utilizes only one pipe coupling design for both mechanical seals and fusion seals. The nuts 62, the fusion seals 34 and the mechanical seals 72 are used on an as needed basis. The present invention, thereby, reduces the cost for tooling of separate couplings. Further, the present invention provides for an easy installation of mechanical seals where fusion seals are not necessary. In the case of mechanical seals, the present invention does not require the mechanical seals to be heated for the seals to be easily slid onto the pipe, as is the case in the prior art.

Figure 10:
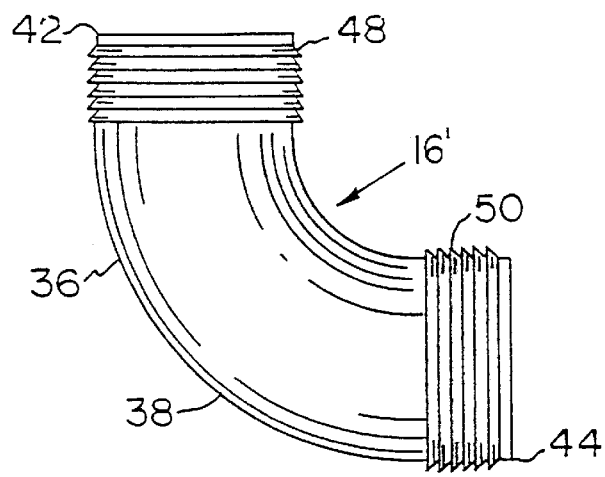
FIG. 10 is an elevational view of an elbow-shaped coupling made in accordance with the present invention.

FIG. 10 shows a second embodiment of the pipe coupling designated as pipe coupling 16'. Pipe coupling 16' is the same as pipe coupling 16 except that it is in the form of an elbow fitting as opposed to a substantially cylindrical shape, as shown in FIGS. 1–3. All other aspects of the pipe coupling 16' are the same as pipe coupling 16.

FIGS. 11–13e show another embodiment of a pipe coupling system 200 made in accordance with the present invention. The pipe coupling system 200 incorporates many of the previously described parts and therefore like reference numerals will be used for like parts.

Figure 11:
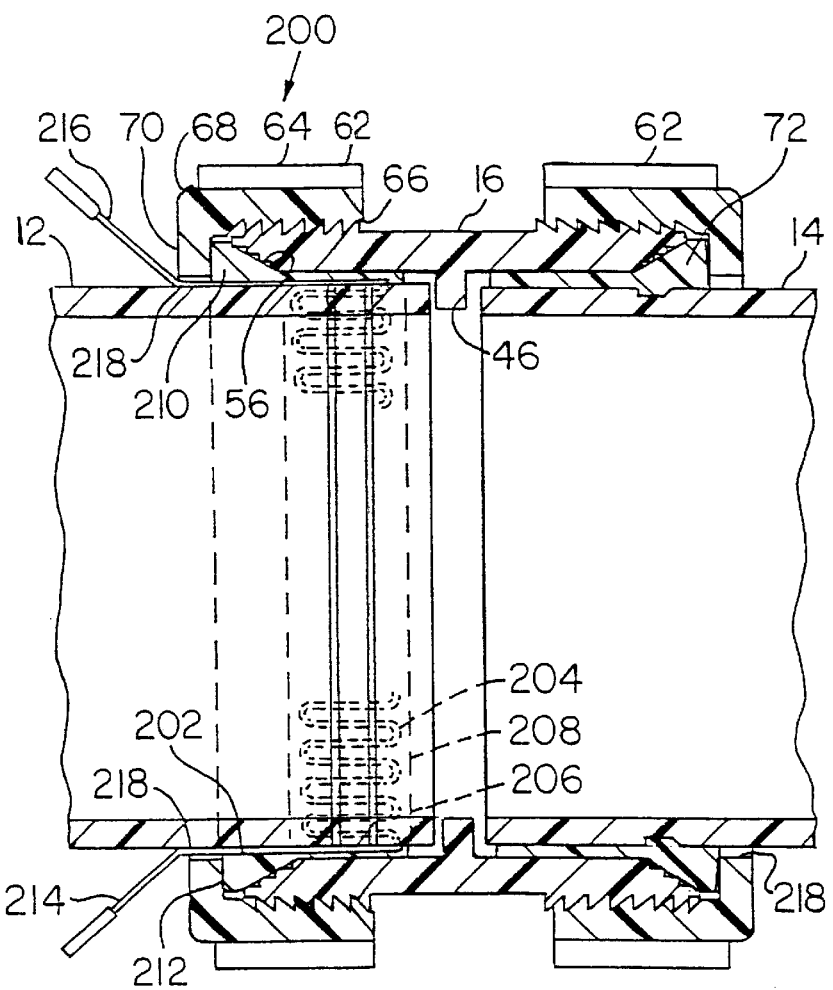
FIG. 11 is another embodiment of a pipe coupling system made in accordance with the present invention.

Referring to FIG. 11, the pipe coupling system 200 includes a first thermal plastic pipe 12, a second thermal plastic pipe 14 secured to each other by a pipe coupling or pipe fitting 16. The second thermoplastic pipe 14 is secured to the coupling 16 through a mechanical seal 72 and a nut 62 in the manner previously described herein. The first thermoplastic pipe 12 is secured to the pipe coupling 16 through a nut 62 and a fusion seal 202 made in accordance with the present invention.

Figure 12:
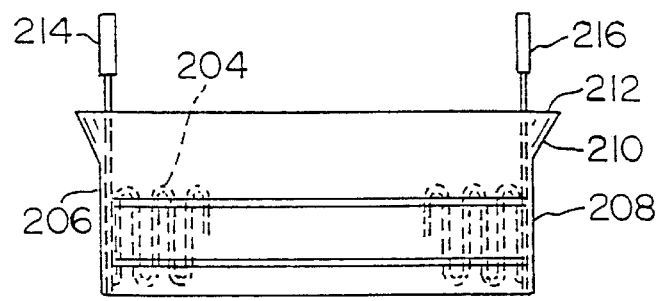
FIG. 12 is an elevational view of the second embodiment of a fusion seal made in accordance with the present invention and shown in FIG. 11.

Referring to FIGS. 11 and 12, the fusion seal 202 is similar to the fusion seal 34 previously described herein. Specifically, the fusion seal 202 includes a circumferential-looped electrical resistive wire 204 embedded within a cylindrical thermoplastic sleeve 206. Preferably, the electrical resistive wiring heating element 204 is made of nickel-chrome or a normal heating wire with nickel plate. Preferably, the electrical resistive wire 204 is made of eighteen (18) gauge wire and has a resistance measured in ohms per inch. The resistance of the wire varies depending on the application. Further, preferably the thermoplastic sleeve is made of polypropylene, such as that previously described and used for the fusion seal 34. The thermoplastic sleeve 206 includes a cylindrical portion 208 and an integral tapered portion 210. The tapered portion 210 includes abutting end 212. Exposed electrical resistive wire leads 214 and 216 are attached to the resistive wire 204.

Figure 13A:
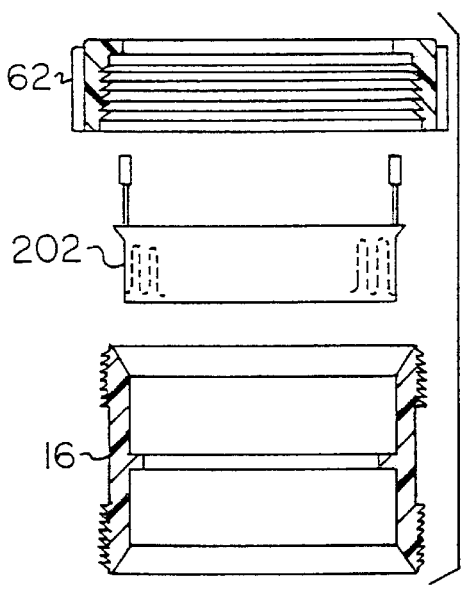
FIGS. 13a–13e are representations showing a sequence of steps for joining pipe together with the fusion seal shown in FIGS. 11 and 12.
Figure 13B:
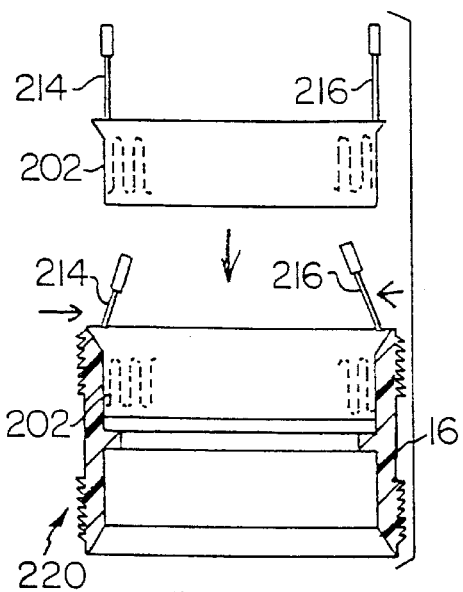
Figure 13C:
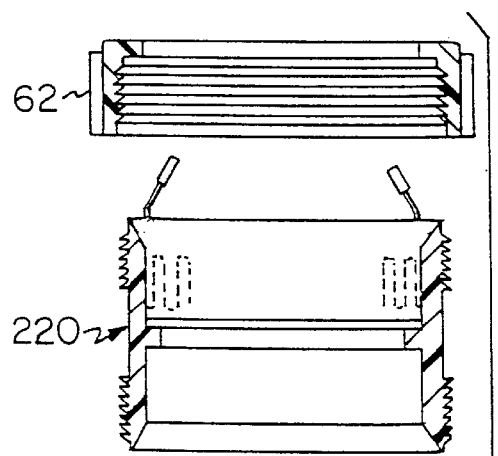
Figure 13D:
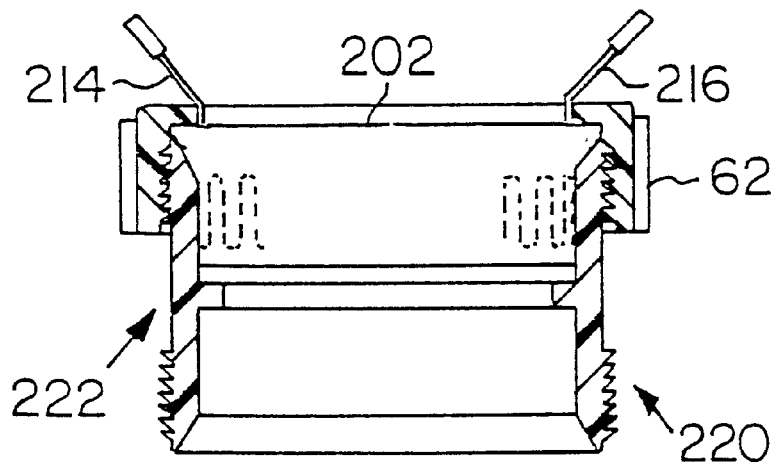

The method of connecting the first thermoplastic pipe 12 to the coupling 16 using the fusion seal 202 shown in FIG. 13a is set forth as follows. Initially, the installer places the fusion seal inside of the pipe coupling 16 so that the cylindrical portion 208 of the fusion seal 200 is received within the interior of the pipe coupling 16 and the tapered portion 210 abuts against the tapered surface 56 of the pipe coupling 16. The installer then bends the wire leads 214 and 216 inwardly, as shown in FIG. 13b forming a first subassembly 220. FIG. 13b shows the fusion seal 202 separately and the first subassembly 220 separately. Then the nut 62 is threadably received by the coupling 16 via pipe coupling threads 50 so that the leads 214 and 216 pass through the nut opening defined by the annular lip 70 and the abutting end 212 abuts against an inner surface of the annular lip 70 and the tapered portion 210 is sandwiched between the annular lip 70 and the tapered surface 56 of the pipe coupling as shown in FIG. 13c. During tightening of the nut 62 onto the coupling 16, the inner surface of the annular lip 70 is pushed down and compresses the tapered portion 210. The wire leads 214 and 216 are then bent outwardly forming a second subassembly 222, as shown in FIG. 13d. In this arrangement, a portion of the tapered portion 210 extends beyond an end of the pipe coupling 16, as shown in FIG. 11.

Figure 13E:
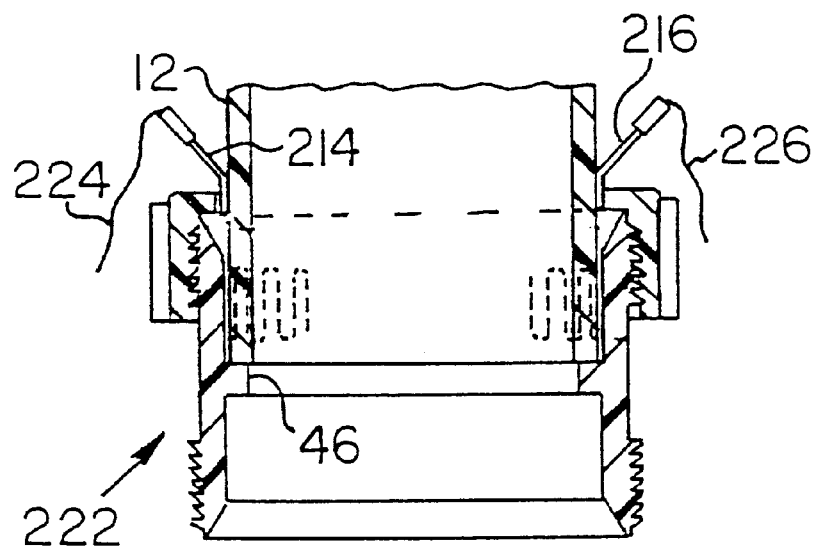

An end of the first thermoplastic pipe 12 is passed through a portion of the second subassembly 222 until it abuts against or is positioned near the annular lip 46 of the pipe coupling 16, as shown in FIG. 13e. As can be seen in FIGS. 11 and 13e, the pipe leads 212 and 214 pass through a gap 218 defined between an inner surface of the annular lip 70 and an outer surface of the first thermoplastic pipe 12. Preferably, the inner diameter of the thermoplastic sleeve 206 is slightly less than the outer diameter of the first thermoplastic pipe 12 so that a pressed fit is formed. Further, after the first thermoplastic pipe 12 is placed within the second subassembly 222, the respective nut 62 is further tightened with a spanner to further compress the tapered portion 210, thereby causing the thermoplastic sleeve 206 to be forced against the outer surface of the first thermoplastic pipe 12. Leads 224 and 226 are then connected to wire leads 214 and 216 and electric current, as previously described, is passed through the leads 224 and 226, causing the thermoplastic sleeve 202 and adjacent portions of the thermoplastic pipe 12 and pipe coupling 16 to melt as previously described.

The fusion seal 202 eliminates the need for clamps that are typically associated with fusion seals, such as hub clamps. The hub clamps are tightened around the pipe section implementing the fusion seal and whereby, after the fusion seal is sealed between the pipe and the coupling, the hub clamp is removed. The purpose of the hub clamp is to place pressure around the fusion seal and the coupling and pipe. This is eliminated by use of the present invention. Further, the present invention provides a more aesthetically pleasing appearance of the fused joint whether a mechanical or a fusion seal is also implemented on the other side of the coupling 16, since nuts 62 are always positioned on opposite sides of the pipe coupling 16 irrespective of whether a mechanical seal or a fusion seal is used.

The present invention can be supplied as a kit for connecting thermoplastic pipe when the kit includes a coupling 16 or 16' and related accessories including one or more nuts 62, fusion seals 34 or 202 and mechanical seals 72 or 72'. Also, although thermoplastic is the preferable material for the components making up the invention, it is contemplated that other plastic materials or copolymers can be used.

Figure 14:
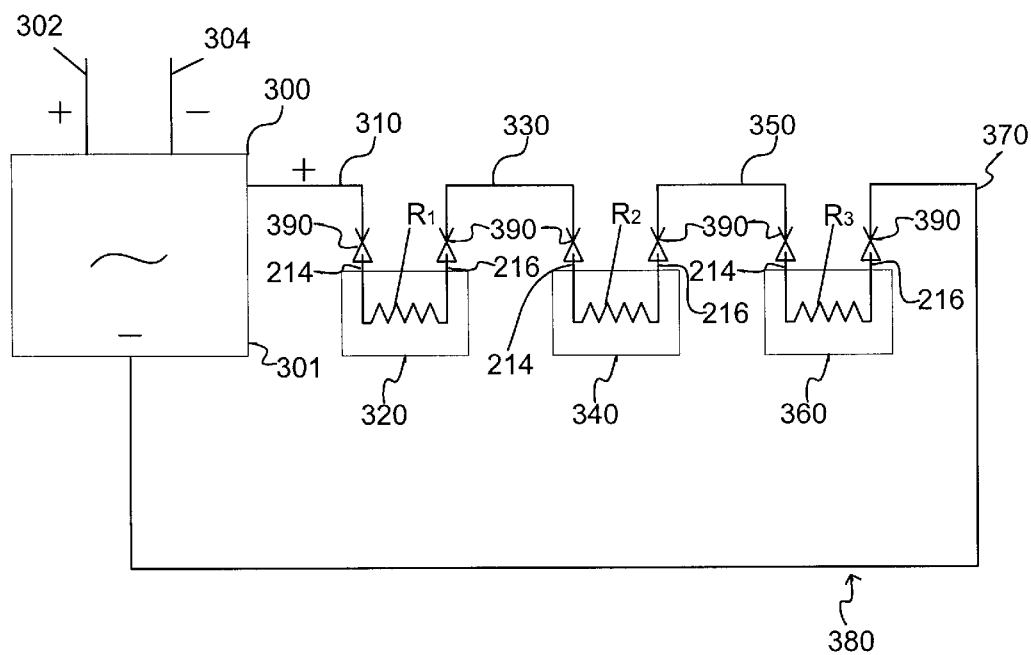
FIG. 14 is a schematic diagram of an electrofusion joining device connected to a plurality of fusion seals made in accordance with the present invention.
Figure 15:
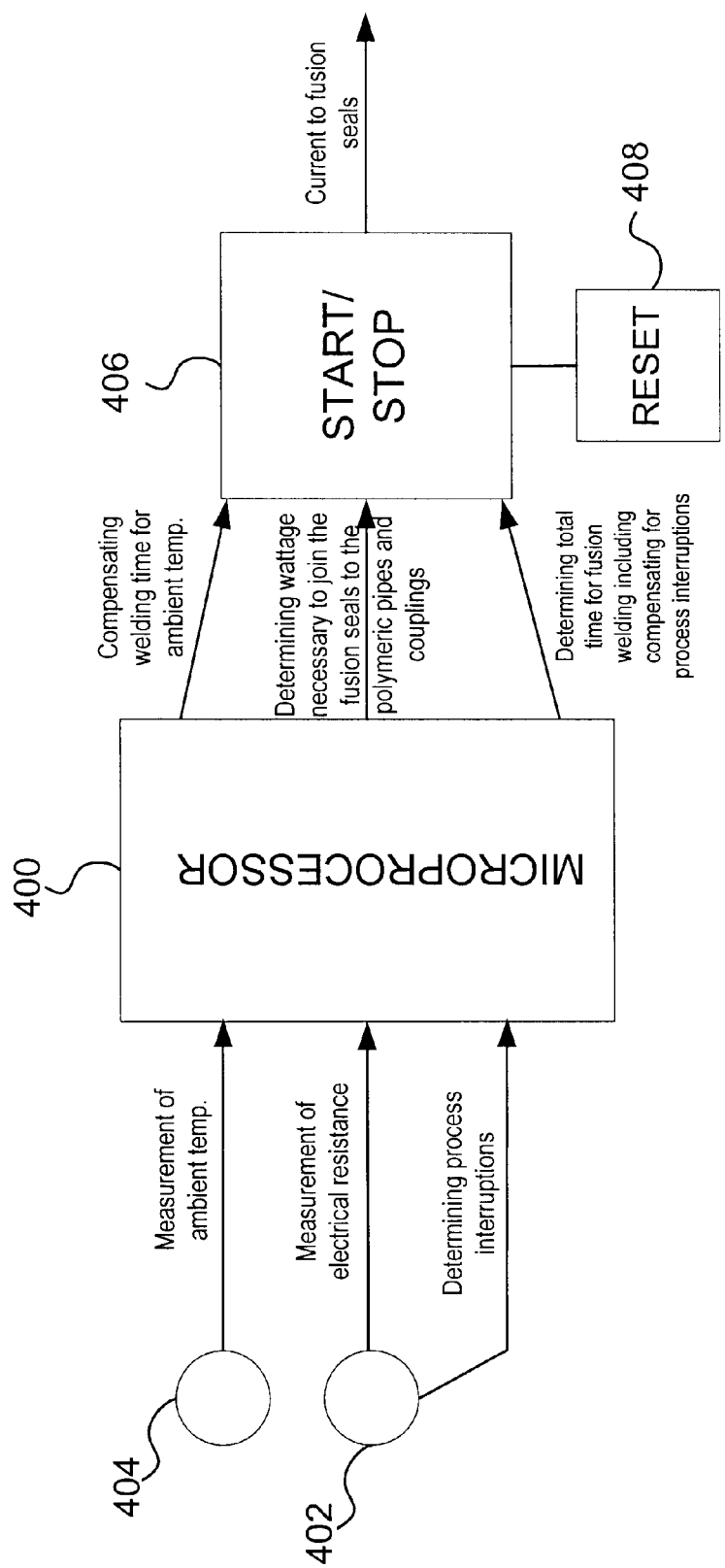
FIG. 15 is a schematic diagram of a microprocessor of the electrofusion joining device made in accordance with the present invention.

Referring to FIGS. 14 and 15, the present invention is also an electrofusion joining device 300 and method for operation thereof. Electrofusion joining device 300 essentially is a power supply that provides a fixed amount of wattage to fusion seals 34 or 202. The electrofusion joining device 300 includes an arrangement for determining process interruptions; an arrangement for compensating for process interruptions; an arrangement for determining ambient temperature; an arrangement for compensating for ambient temperature; and an arrangement for passing electric current and stopping electric current to the fusion seals. The electrofusion device 300 may also include an arrangement for determining the number and size of fusion seals to be joined. Specifically, the electrofusion joining device 300 includes a body 301 having a current transformer, an analog to digital converter, and a microprocessor 400 and sine wave phase control to regulate heating current. Such a general arrangement is shown in U.S. Pat. No. 3,564,204, which is hereby incorporated by reference.

The electrofusion joining device 300 uses 120 volt AC (alternating current) and provides 720 watts of power to weld or fuse respective fusion seals 34 or 202 to the respective plastic pipes and pipe couplings as set forth herein. Power may also be supplied to the electrofusion joining device 300 by a DC (direct current) source, such as a battery.

Referring to FIG. 14, a lead wire 310 electrically coupled to the electrofusion joining device 300 is connected to a resistive wire R1 of a fusion seal 320. A lead wire 330 is connected in series with the resistive wire R1 and a resistive wire R2 of a fusion seal 340. A lead wire 350 is connected in series to the resistive wire R2 and a resistive wire R3 of a fusion seal 360. A lead wire 370 is connected in series with the resistive wire R3 and is electrically coupled to the electrofusion joining device 300 forming an electric circuit 380. The fusion seals 320, 340 and 360 correspond to the fusion seal 202 and the resistive wires R1, R2 and R3 correspond to resistive wire 204. The lead wires 310, 330, 350 and 370 are connected to respective resistive wires R1, R2 and R3 via respective wire leads 214 and 216. Alligator type clips 390 or other clips may be provided on lead wires 310, 330, 350 and 370 to attach to lead wires 214 and 216. The arrangement for determining number and size of fusion seals connected in series to be welded simultaneously can vary from one size and/or number to another size and/or number not to exceed the required wattage required to adequately melt the sleeves 206 of the fusion seals 320 and the adjacent portions of the pipe coupling system 10.

In operation, power is supplied to the electrofusion joining device 300 from power lines 302 and 304. Initially, the arrangement for determining the wattage necessary to join the fusion seals to the polymeric pipes and couplings is achieved by the microprocessor 400 which determines the total resistance of the circuit 380 formed by lead wires 310, 330, 350 and 370 and resistive wires R1, R2 and R3. This can be accomplished via an electric ohmmeter 402 or appropriate circuitry and/or software to measure the electrical resistance of these elements. The microprocessor 400 is electrically coupled to the electric ohmmeter 402, which in combination are used to determine the total resistance of the electrical circuit 380. If the number of fusion seals connected in a series has a resistance less than or equal to a fixed resistance maximum value, then the microprocessor 400 will permit fusion to begin by passing electric current to the fusion seals. Likewise, the microprocessor 400 will stop the current from passing through the electrical circuit 380 if the number of fusion seals connected in series has a resistance greater than the fixed resistance maximum value. Preferably, the time to perform the fusion is fixed or set based upon ambient temperature and possible circuit interruptions, for example, 110 seconds. The microprocessor 400, which is pre-programmed, can calculate the total resistance, the total time and wattage, based upon the resistance of the resistive wires R1, R2 and R3, required to adequately melt the fusing seals and adjacent pipes and couplings. The microprocessor 400 adjusts the wattage and passes current through the circuit 380 accordingly to adequately melt and join the respective fusion seals 320, 340 and 360 to the adjacent pipes and pipe couplings. If power is interrupted or the circuit 380 is opened, which can be determined by the ohmmeter 402, the microprocessor 400 will calculate the time in which power is stopped to the respective resistive wires R1, R2 and R3. Once power is resumed and/or the circuit closed, power is then supplied to those circuits to compensate for the opening of the circuit or stopping of power thereof.

After a fixed period of time, power is stopped to the circuit 380 and the joined fusion seals 320, 340 and 360 are permitted to cool and an adequate seal is formed between the fusion seals and respective adjacent plastic pipes and plastic pipe couplings. Lead wires 310, 330, 350 and 370 are then removed from the fusion seals 320, 340 and 360 and another set of fusion seals may be welded. In the present invention, it is important that the resistive wires R1, R2 and R3 be appropriately sized for different sized couplings so that different sized fusion seals can be adequately melted with the available power. Further, although preferably the power supplied by the electrofusion device is 720 watts, different wattage designs may be provided and determined by the series resistance of the seals. Preferably the leads wires 310, 330, 350 and 370 include alligator-type clips 390 to attach to the resistive wires R1, R2 and R3. This permits easy installation and removal of the lead wires.

The electrofusion joining device 300 preferably uses AC, as opposed to DC. An advantage of the present invention is that the installer of the pipe couplings does not have to select specific weld times based on the size and number of joints since this is taken in account by the microprocessor 400 and the initial calculation of the resistance of the circuit 380. Another advantage is that the present invention does not use various different predetermined currents for various sized joints or use controlled voltage. A further advantage is that the present invention does not use a log weld temperature compensation and does not use specific heat of resin to adjust weld time and power.

The present invention does provide an arrangement for determining process interruptions or weld interruption if a weld connection is momentarily broken during a weld. This is done by the microprocessor 400. Also, the present invention provides an arrangement for compensating for the process interruptions. Here, the microprocessor 400 of the electrofusion joining device 300 determines the broken time and automatically compensates when the circuit 380 is reconnected. Further, the present invention prevents the electrofusion joining device 300 from starting if too many joints are connected in series.

The present invention also includes varying the voltage based on the resistance of each resistive wire R1, R2 and R3 and uses a constant current and a fixed weld time. Finally, the present invention includes an arrangement for determining ambient temperature and compensating for ambient temperature which will affect welding time. A sensor 404 such as a thermocouple for determining ambient temperature is used in connection with the microprocessor 400 and automatically compensates for welding time based on ambient temperature. In this manner, the standard welding time, which is based upon a fixed ambient temperature, may be increased or decreased based upon the actual ambient temperature. Alternatively, the wattage may also be varied to account for changes in ambient temperature. Therefore, the ambient temperature will not affect the quality of the joint.

The following is a method of operation of the electrofusion joining device. Cut pipe square to approximate length and deburr ends. Preferably, the pipe should be visually free of any dirt and/or debris. Acetone cleaner may facilitate the cleaning process. Remove nuts from fittings. Insert the fusion seals in the sockets with leads in the desired position. Bend the lead wires inwardly and reapply the nuts. Bend the leads outwardly. Hang a depth gauge ruler off the end of the pipe and mark the pipe according to its diameter. Insert the pipe into the joint assembly until the depth mark is flush with the top nut. Tighten the nuts. Connect fusion clips to the lead wires of the fusion seal. For multiple joints connect in series. Press the start/stop button 406 on the electrofusion joining device or via a remote activator (not shown). Upon completion, press reset 408 on the machine remote, remove the fusion clips and move on to the next joint. The reset 408 resets the microprocessor 400 so that the fusion process can be reinitiated for another set of fusion seals by pressing the start/stop button 406.

Although the present invention has been described in detail in connection with the discussed embodiments, various modifications may be made by one of ordinary skill in the art without departing from the spirit and scope of the present invention.

It is claimed:

1. An electrofusion joining device for joining fusion seals to polymeric pipes and polymeric couplings, comprising:
    means for determining a wattage necessary to join the fusion seals to the polymeric pipes and couplings;
    means for determining process interruptions;
    means for compensating for the process interruptions; and
    means for passing electric current and stopping electric current to the fusion seals.

2. The device of claim 1, further comprising a means for determining ambient temperature.

3. The device of claim 2, further comprising a means for compensating for ambient temperature.

4. A method for joining polymeric fusion seals to polymeric pipes and polymeric couplings, comprising the steps of:

a) connecting a plurality of fusion seals in electrical series to an electrofusion joining device to form an electrical circuit;
b) determining an electrical resistance of the electrical circuit;
c) calculating a wattage necessary to pass through the electrical circuit to melt the fusion seals and adjacent material of the polymeric couplings in a fixed period of time;
d) passing current through the electrical circuit for the fixed period of time and causing the fusion seals to be melted to be joined to the adjacent pipes and the adjacent couplings; and
e) stopping the current and permitting the joined seal to cool.

5. The method as claimed in claim 4, wherein each of the electrofusion seals include resistive wires and a voltage is varied based on a resistance of each resistive wire when passing current through the electrical circuit.

6. The method as claimed in claim 4, wherein each of the fusion seals includes leads and the electrofusion seals are electrically coupled to each other by lead wires having alligator-type clips that are used to connect the leads of the fusion seal to the electrofusion joining device.

7. The method as claimed in claim 4, further comprising stopping the current from passing through the electrical circuit if a number of fusion seals connected in series has a resistance greater than a fixed resistance maximum value.

8. The device of claim 2, wherein the means for determining ambient temperature comprises a sensor.

9. The device of claim 8, wherein the means for compensating for ambient temperature comprises a microprocessor.

10. The device of claim 1, wherein the means for determining for process interruption comprises an ohmmeter.

11. The device of claim 10, wherein the means for compensating for process interruptions comprises a microprocessor.

12. A method for joining fusion seals to polymeric pipes and polymeric couplings, comprising:

a) determining a wattage necessary to join the fusion seals to the polymeric pipes and couplings;
b) passing electric current and stopping the electric current to the fusion seals;
c) determining process interruptions; and
d) compensating for the process interruptions.

13. The method as claimed in claim 12, further comprising determining ambient temperature.

14. The method as claimed in claim 13, further comprising compensating for ambient temperature.

* * * * *